United States Patent
Linkola et al.

(10) Patent No.: US 8,885,635 B2
(45) Date of Patent: Nov. 11, 2014

(54) SYSTEM AND METHOD FOR SELECTIVELY PROVISIONING TELECOMMUNICATIONS SERVICES BETWEEN AN ACCESS POINT AND A TELECOMMUNICATIONS NETWORK USING A SUBSCRIBER IDENTIFIER

(75) Inventors: Janne P. Linkola, Espoo (FI); Christopher E. Caldwell, Woodstock, GA (US); Omar Hassan, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 171 days.

(21) Appl. No.: 12/175,414

(22) Filed: Jul. 17, 2008

(65) Prior Publication Data
US 2010/0014507 A1    Jan. 21, 2010

(51) Int. Cl.
| | |
|---|---|
| *H04L 12/66* | (2006.01) |
| *H04L 12/28* | (2006.01) |
| *H04L 12/56* | (2006.01) |
| *H04W 88/08* | (2009.01) |
| *H04W 92/02* | (2009.01) |
| *H04W 12/08* | (2009.01) |

(52) U.S. Cl.
CPC .............. *H04W 88/08* (2013.01); *H04W 92/02* (2013.01); *H04W 12/08* (2013.01)
USPC .......................................... 370/352; 370/401

(58) Field of Classification Search
CPC .. H04W 88/08; H04W 84/22; H04L 63/0853; H04M 17/103
USPC ............... 370/395.2, 252, 352, 401; 455/558, 455/556.1, 557
See application file for complete search history.

(56) References Cited

U.S. PATENT DOCUMENTS

| | | | |
|---|---|---|---|
| 4,998,271 | A | 3/1991 | Tortola et al. |
| 5,513,263 | A | 4/1996 | White et al. |
| 6,493,629 | B1 | 12/2002 | Van Bosch |
| 6,612,489 | B2 | 9/2003 | McCormick et al. |
| 6,615,035 | B1 * | 9/2003 | Lucidarme et al. ........... 455/411 |

(Continued)

FOREIGN PATENT DOCUMENTS

| | | |
|---|---|---|
| CA | 2666472 | 8/2010 |
| EP | 1530321 A1 | 5/2005 |

(Continued)

OTHER PUBLICATIONS

International Search Report and Written Opinion for PCT/US2009/051072; Applicant: T-Mobile USA, Inc.; Mailing Date: Nov. 6, 2009, 12 pages.

(Continued)

*Primary Examiner* — Hoang-Chuong Vu
(74) *Attorney, Agent, or Firm* — Perkins Coie LLP

(57) ABSTRACT

A method and system for reducing network load by selectively provisioning services between an access point and a carrier network is disclosed. The access point supports telecommunications services over an IP network. The access point includes a network connection and a telephone connector capable of connecting to a standard landline telephone. The access point also includes at least one detection component that detects whether a landline telephone is plugged in to the telephone connector. The access point is configured to provision a telecommunications services through the IP network when it detects that an identification module is present.

12 Claims, 7 Drawing Sheets

(56) References Cited

U.S. PATENT DOCUMENTS

| | | | |
|---|---|---|---|
| 6,985,583 B1 | 1/2006 | Brainard et al. | |
| 7,110,545 B2 | 9/2006 | Furuya et al. | |
| 7,295,556 B2 | 11/2007 | Roese et al. | |
| 7,346,678 B1 | 3/2008 | Zhu et al. | |
| 7,353,017 B2* | 4/2008 | Chen et al. | 455/414.2 |
| 7,366,542 B2* | 4/2008 | Schmidt | 455/558 |
| 7,376,221 B1 | 5/2008 | Remy et al. | |
| 7,433,673 B1 | 10/2008 | Everson et al. | |
| 7,529,256 B2 | 5/2009 | Pathan | |
| 7,574,207 B1 | 8/2009 | O'Neil et al. | |
| 7,577,458 B2 | 8/2009 | Lin | |
| 7,610,062 B2* | 10/2009 | Beeman et al. | 455/558 |
| 7,701,947 B2* | 4/2010 | Cunetto et al. | 370/395.2 |
| 7,773,579 B1 | 8/2010 | Liu et al. | |
| 7,792,093 B2* | 9/2010 | Myhre et al. | 370/352 |
| 7,843,903 B2 | 11/2010 | Bakke et al. | |
| 7,864,673 B2 | 1/2011 | Bonner | |
| 8,160,614 B2 | 4/2012 | Shaffer | |
| 8,320,344 B2 | 11/2012 | Hodroj et al. | |
| 2001/0030235 A1* | 10/2001 | Hedemann et al. | 235/451 |
| 2001/0052006 A1 | 12/2001 | Barker et al. | |
| 2002/0147926 A1* | 10/2002 | Pecen et al. | 713/201 |
| 2002/0157090 A1 | 10/2002 | Anton, Jr. | |
| 2002/0188581 A1 | 12/2002 | Fortin et al. | |
| 2003/0119480 A1 | 6/2003 | Mohammed | |
| 2004/0078708 A1 | 4/2004 | Li et al. | |
| 2004/0128345 A1 | 7/2004 | Robinson et al. | |
| 2004/0133689 A1 | 7/2004 | Vasisht | |
| 2004/0192299 A1 | 9/2004 | Wilson et al. | |
| 2004/0203815 A1 | 10/2004 | Shoemake et al. | |
| 2005/0026650 A1 | 2/2005 | Russell | |
| 2005/0054342 A1 | 3/2005 | Otsuka | |
| 2005/0063542 A1 | 3/2005 | Ryu | |
| 2005/0078819 A1 | 4/2005 | Hsu et al. | |
| 2005/0083911 A1 | 4/2005 | Grabelsky et al. | |
| 2005/0086346 A1 | 4/2005 | Meyer | |
| 2005/0094592 A1* | 5/2005 | Schmidt | 370/328 |
| 2005/0114504 A1 | 5/2005 | Marolia et al. | |
| 2005/0159149 A1 | 7/2005 | Wen et al. | |
| 2005/0160287 A1 | 7/2005 | Mehta et al. | |
| 2005/0174992 A1 | 8/2005 | Files et al. | |
| 2005/0181805 A1 | 8/2005 | Gallagher | |
| 2005/0243809 A1 | 11/2005 | Best et al. | |
| 2006/0068769 A1 | 3/2006 | Adya et al. | |
| 2006/0075485 A1 | 4/2006 | Funahashi et al. | |
| 2006/0121941 A1* | 6/2006 | Shiflett | 455/558 |
| 2006/0198361 A1 | 9/2006 | Chen | |
| 2006/0215668 A1 | 9/2006 | Sethi et al. | |
| 2006/0223498 A1 | 10/2006 | Gallagher et al. | |
| 2006/0256800 A1 | 11/2006 | Harrington et al. | |
| 2006/0270448 A1 | 11/2006 | Huotari et al. | |
| 2006/0293024 A1 | 12/2006 | Benco et al. | |
| 2006/0293038 A1* | 12/2006 | Walter et al. | 455/418 |
| 2006/0293082 A1* | 12/2006 | Neuhaus | 455/558 |
| 2007/0026862 A1 | 2/2007 | Hicks et al. | |
| 2007/0049342 A1* | 3/2007 | Mayer et al. | 455/558 |
| 2007/0079113 A1 | 4/2007 | Kulkarni et al. | |
| 2007/0115900 A1 | 5/2007 | Liang et al. | |
| 2007/0123231 A1* | 5/2007 | Kim | 455/414.1 |
| 2007/0168553 A1 | 7/2007 | Jones et al. | |
| 2007/0177562 A1* | 8/2007 | Castrogiovanni et al. | 370/338 |
| 2007/0195803 A1* | 8/2007 | Lowery et al. | 370/401 |
| 2008/0020773 A1* | 1/2008 | Black et al. | 455/445 |
| 2008/0046998 A1 | 2/2008 | Cromer et al. | |
| 2008/0095086 A1 | 4/2008 | Linkola et al. | |
| 2008/0151866 A1 | 6/2008 | Wu | |
| 2008/0160914 A1 | 7/2008 | McRae et al. | |
| 2008/0189550 A1* | 8/2008 | Roundtree | 713/176 |
| 2008/0219223 A1* | 9/2008 | Bienas et al. | 370/338 |
| 2008/0254833 A1* | 10/2008 | Keevill et al. | 455/558 |
| 2008/0311917 A1* | 12/2008 | Marathe et al. | 455/445 |
| 2009/0043876 A1* | 2/2009 | Zhang et al. | 709/223 |
| 2009/0074187 A1 | 3/2009 | Inoue et al. | |
| 2009/0085760 A1 | 4/2009 | Lee | |
| 2009/0132675 A1* | 5/2009 | Horn et al. | 709/207 |
| 2009/0154701 A1 | 6/2009 | Kosaraju et al. | |
| 2009/0163245 A1* | 6/2009 | Oozeki | 455/558 |
| 2009/0215394 A1 | 8/2009 | Dewan | |
| 2009/0220216 A1* | 9/2009 | Marsh et al. | 386/124 |
| 2009/0287922 A1* | 11/2009 | Herwono et al. | 713/155 |
| 2010/0014506 A1 | 1/2010 | Linkola et al. | |
| 2010/0190492 A1* | 7/2010 | Jiang | 455/432.1 |
| 2010/0235621 A1 | 9/2010 | Winkler et al. | |
| 2010/0265845 A1 | 10/2010 | Lampen | |
| 2011/0299686 A1 | 12/2011 | Saboff et al. | |
| 2012/0317224 A1 | 12/2012 | Caldwell et al. | |
| 2013/0083785 A1 | 4/2013 | Hodroj et al. | |
| 2013/0084823 A1* | 4/2013 | Glass et al. | 455/404.1 |
| 2013/0178217 A1* | 7/2013 | Keevill et al. | 455/446 |

FOREIGN PATENT DOCUMENTS

| | | |
|---|---|---|
| EP | 1865656 A1 | 12/2007 |
| WO | WO-2004102941 A1 | 11/2004 |
| WO | WO-2006018047 A1 | 2/2006 |
| WO | WO-2006028455 | 3/2006 |
| WO | WO-2006062907 A1 | 6/2006 |
| WO | WO-2006078430 A2 | 7/2006 |
| WO | WO-2006135285 A2 | 12/2006 |
| WO | WO-2007015075 A1 | 2/2007 |
| WO | WO-2008036938 A2 | 3/2008 |
| WO | WO-2010099229 | 9/2010 |

OTHER PUBLICATIONS

"Vonage and Motorola Announce a Co-Branded Internet Telephone Adaptor with Wireless Router," PR Newswire (U.S.), Mar. 14, 2007, Copyright 2007 PR Newswire Association LLC, 2 pages.

Bertolucci, Jeff, "Vonage's flashy V-Portal offers easier VoIP setup," PC World, Apr. 1, 2008, Copyright 2008 PC World Communications, Inc., 1 page.

Dontronics, USB to RJ-11 VoIP Phone Adaptor, Apr. 19, 2006, <http://www.dontronics.com/phoneconnector.html>, 7 pages.

Greene, Tim, "Vonage tailors VoIP for small firms: Flat-fee dialing includes local, long-distance calls," Network World, Jun. 23, 2003, Copyright 2003 Network World, Inc., 2 pages.

Honan, Mathew, "I Am Here: One Man's Experience With the Location-Aware Lifestyle," Wired Magazine: 17.2 (pp. 1-7), http://www.wired.com/gadgets/wireless/magazine/17-02/lp_guineapig?currentPage=all [date accessed Jan. 23, 2009].

IVT Corporation, *Bluetooth* PSTN Voice AP, Apr. 19, 2006, <http:www.ivtcorporation.com/products/ap/index.php>, 3 pages.

Lazarowitz, Elizabeth, "Easy Call: Phoning Via Web," New York Daily News, Feb. 5, 2007, Copyright 2007 Daily News, New York, 3 pages.

Shaw, Keith, "VoIP invades the home network," Network World, Aug. 30, 2004, Copyright 2004 Network World, Inc., 1 page.

Telco Systems: A BATM Company, Access200 Product Family Voice over IP Analog Telephone Adapters, Copyright 2005 Telco Systems, 2 pages.

International Search Report and Written Opinion for PCT/US2010/026715; Filed on Mar. 9, 2010, Applicant: T-Mobile USA, Inc., Mailed on Oct. 18, 2010, 10 pages.

"AirStation One-Touch Secure System (AOSS)," White paper downloaded from www.buffalo-technology.com on May 27, 2009 bearing a date of Oct. 2004, Buffalo technology (USA), Inc., pp. 1-7.

"Frequently Asked Questions: Wi-Fi Protected Setup," Wi-Fi Alliance 2006, pp. 1-4.

"Wi-Fi Protected Setup," Wi-Fi Alliance 2007, http:www.wi-fi.org-wifi-protected-setup- [Accessed on Sep. 28, 2010], 2 pages.

Helander, Johannes et al., "Secure Web Services for Low-Cost Devices," Proceedings of the Eighth IEEE International Symposium on Object-Oriented Real-Time Distributed Computing (ISORC'05), May 18-20, 2005, pp. 130-139.

Houghton, Mike, "Cellular Modems: 3G Access on the Move," article downloaded from www.enterpriseplanet.com on May 27, 2009 bearing a date of May 25, 2006, Enterprise IT Planet, 4 pages.

IEEE-SA Standards Board, IEEE Std. 802.11, 1999 Edition, Reaffirmed 2003, 37 pages.

(56) References Cited

OTHER PUBLICATIONS

International Search Report and Written Opinion, International Application No. PCT-US2007-82010, Filed on Oct. 19, 2007, Applicant: T-Mobile USA, Inc., Mailed on Jun. 16, 2008, 10 pages.
International Search Report and Written Opinion, International Application No. PCT-US2007-82010, Filed on Oct. 19, 2007, Applicant: T-Mobile USA, Inc., Mailed on Jun. 18, 2008, 10 pages.
International Search Report and Written Opinion, International Application No. PCT-US2007-82285, Filed on Oct. 23, 2007, Applicant: T-Mobile USA, Inc., Date of Mailing Mar. 10, 2008, 10 pages.
N1 Wireless Router User Manual, Belkin International, Inc., 2007, 104 pages.
"Wi-Fi Certified™ for Wi-Fi Protected Setup™: Easing the User Experience for Home and Small Office Wi-Fi® Networks," © 2007, 2008, 2009 Wi-Fi Alliance, 14 pages.
Belkin International, Inc., "Belkin N1 Vision Wireless Router User Manual," Jul. 11, 2007, 117 pages.
European Patent Office, Supplementary European Search Report and Opinion, EP Patent Application 07854249, mailed Jun. 4, 2012, 6 pages.
International Searching Authority, International Search Report, PCT Application PCT/US2010/025271, mailed Dec. 28, 2010, 3 pages.
International Searching Authority, Written Opinion, PCT Application PCT/US2010/025271, mailed Dec. 28, 2010, 4 pages.
European Patent Office, Extended European Search Report, EP Patent Application 07854358.4, mailed Feb. 6, 2014, 8 pages.
Nikolaidis, Apostolos E. et al. "Management Traffic in Emerging Remote Configuration Mechanisms for Residential Gateways and Home Devices," *IEEE Communications Magazine*, May 2005, pp. 154-162.

* cited by examiner

SYSTEM AND METHOD FOR SELECTIVELY PROVISIONING TELECOMMUNICATIONS SERVICES BETWEEN AN ACCESS POINT AND A TELECOMMUNICATIONS NETWORK USING A SUBSCRIBER IDENTIFIER

BACKGROUND

In this digital age, modern telecommunication service providers and device manufacturers are increasingly relying on public and/or private IP networks, including the Internet, as a core part of their technology. For example, many telecommunications service providers now offer a suite of Voice over IP (VoIP) services, as well as various data services, that utilize IP networks and/or IP-based wireless access networks for at least part of their infrastructure. For example, these IP-based wireless access networks may be based on IEEE 802.16 ("WiMAX"), IEEE 802.20 Mobile Broadband Wireless Access (MBWA), Ultra Wideband (UWB), 802.11 wireless fidelity ("Wi-Fi"), Bluetooth, and similar standards. Likewise, device manufacturers are producing a new generation of mobile devices such as wireless handhelds, wireless handsets, mobile phones, personal digital assistants, notebook computers, and similar devices. These devices are enabled to send and receive information using IP-based telecommunications services. In fact, many of today's modern mobile devices are able to function as "dual-mode devices" that take advantage of both cellular network technologies and IP-based technologies.

Unlicensed Mobile Access (UMA) technology has developed as part of this trend to incorporate IP solutions into mobile device telecommunication systems. UMA technology has been accepted into Release 6 of the 3rd Generation Partnership Project (3GPP) and is also referred to as Generic Access Network (GAN) technology. In various implementation schemes, UMA allows wireless service providers to merge cellular networks (such as Global System for Mobile Communications (GSM)) networks and IP-based wireless networks into one seamless service (with one mobile device, one user interface, and a common set of network services for both voice and data). One goal of UMA is to allow subscribers to move transparently between cellular networks and IP-based wireless networks with seamless voice and data session continuity, much like they can transparently move between cells within the cellular network. Seamless in-call handover between the IP-based wireless network and the cellular network ensures that the user's location and mobility do not affect the services delivered to the user.

At an operational level, UMA technology effectively creates a parallel radio access network, the UMA network, which interfaces to the mobile core network using standard mobility-enabled interfaces. For example, UMA can replace a system's GSM radio technology on the lower protocol layers with a wireless LAN, or similar technology. A call or other communication may be tunneled to the Mobile Switching Center (MSC) of a mobile service provider via an access point (e.g., a WiFi access point connected to a modem via the Internet) and gateway (e.g., a UMA network controller). In many cases, the mobile core network remains unchanged, making it much easier to maintain full service and operational transparency and allowing other aspects of the service infrastructure to remain in place. For example, in many systems that utilize UMA, the existing service provider's business support systems (BSS), service delivery systems, content services, regulatory compliance systems, and operation support systems (OSS) can support the UMA network without change. Likewise, service enhancements and technology evolution of the mobile core network apply transparently to both cellular access and UMA.

SUMMARY

Described in detail herein is a system and method of provisioning telecommunications services through an access point. The access point is suitable for use as an access point to an IP-based wireless telecommunications network to interface with a landline telephone. The method includes automatically determining if an identification module is inserted into an identification module slot in the access point. The identifier module and the access point are configured to permit an end user to physically and manually insert at least a portion of the identifier module in the access point. The method further includes, in response to determining that the identification module was inserted into the identification module slot on the access point, automatically provisioning a communications connection between the landline telephone and the IP-based network.

Also described in detail herein is a system and method for provisioning voice communications between an access point and a telecommunications system. The method includes receiving a registration signal from the access point, where the signal includes a subscriber identifier received from a user-provided memory device that stores the subscriber identifier in tamper-resistant memory. The method can compare the subscriber identifier to a range of values, where the range of values designates a set of subscriber identifiers authorized to receive particular telecommunications services. The method further includes finding a street address associated with the subscriber identifier; and, selectively provisioning telecommunications services between the access point and the telecommunications network, based at least in part on the comparison and on whether the street address was found.

DETAILED DESCRIPTION

The following description provides specific details for a thorough understanding of, and enabling description for, various embodiments of the technology. One skilled in the art will understand that the technology may be practiced without these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

I. Sample Network Configurations

Figure 1:
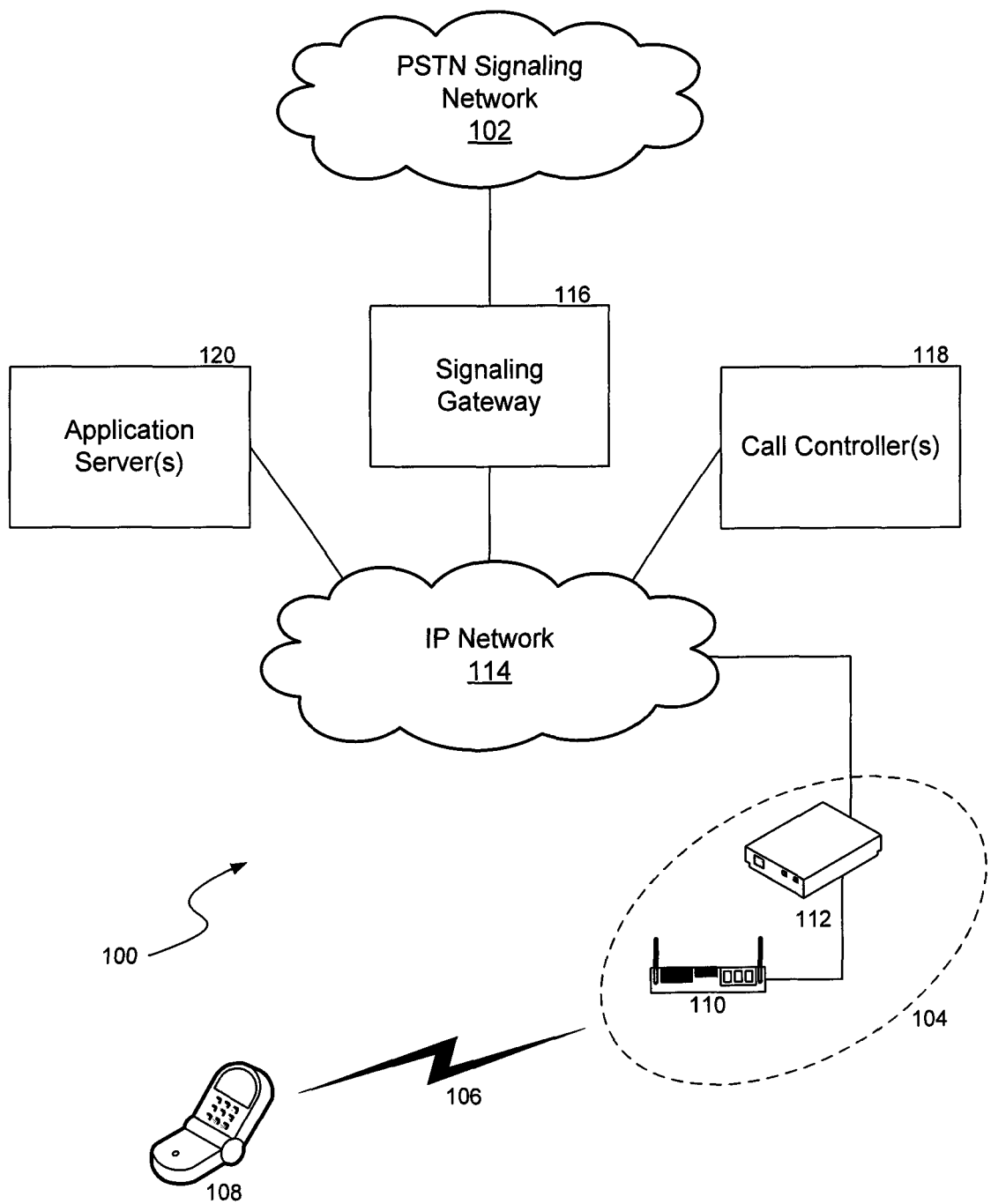
FIG. 1 illustrates aspects of a sample network system that allows IP-based communications in conjunction with a public switched telephone network (PSTN).

FIG. 1 illustrates aspects of a sample network system 100 that allows VoIP-based communications in conjunction with a public switched telephone network (PSTN) 102. The system 100 includes at least one wireless access point 104. The access point 104 may be public or private, and may be located, for example, in a subscriber's residence (e.g., home, apartment or other residence), in a public location (e.g., coffee shops, retail stores, libraries, or schools) or in corporate or other private locations. In the sample system of FIG. 1, the access point 104 can accept communications 106 from at least one suitably configured telecommunications device 108 (e.g., a VoIP device). Various examples of network technology that may be involved in communicating between the telecommunications device 108 and the access point 104 include the IEEE 802.16 (WiMAX), IEEE 802.20 Mobile Broadband Wireless Access (MBWA), Ultra Wideband (UWB), 802.11 wireless fidelity (Wi-Fi), Bluetooth standards, or other similar standards. The access point 104 includes a wireless router 110 and a broadband modem 112 that enable connection to an Internet Protocol (IP) network 114. The IP network 114 may comprise one or more public networks, private networks, or combination of public and private networks.

In a communication or set of communications 106, the access point 104 receives IP packets from the telecommunications device 108. These IP packets are then transported through the IP network 114 to a signaling gateway 116, which in the example of FIG. 1, is operated by a telecommunications service provider. At the signaling gateway 116, the IP packets are converted to a traditional phone service signal. The phone service signal is then conveyed to a recipient via the PSTN 102.

The network system 100 of FIG. 1 also includes a call controller 118 that provides call logic and call control functions for communications sent through the system and an application server 120 that provides logic and execution of one or more applications or services offered by the telecommunications service provider, such as applications that implement various access and security rules. In this example, a telecommunication service provider manages both the call controller 118 and the application server 120.

Figure 2:
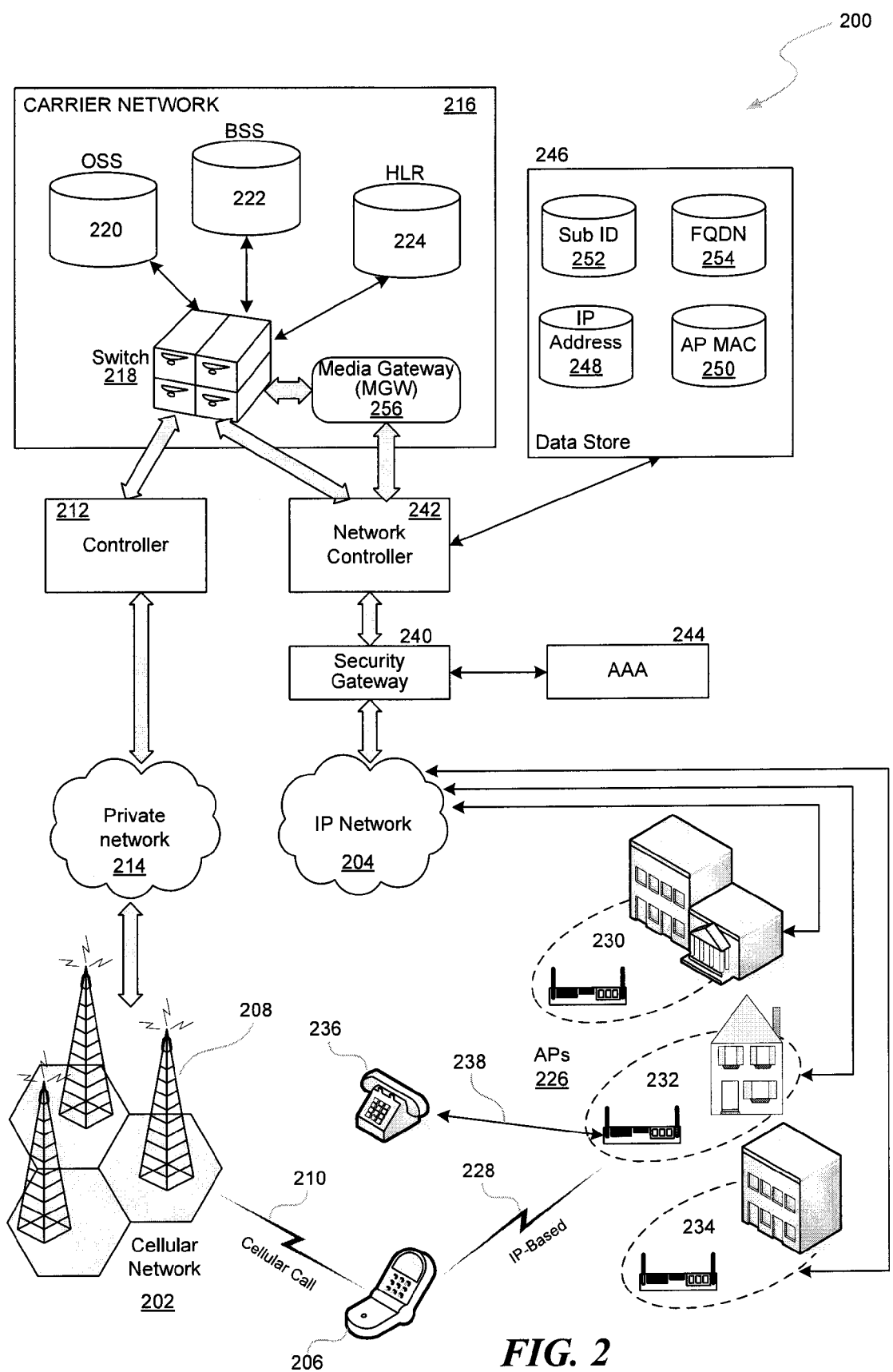
FIG. 2 illustrates an example converged wireless network system that combines a cellular network with an IP-based wireless telecommunications network.

FIG. 2 illustrates an example converged wireless network system that combines a cellular network with an IP-based wireless telecommunications network. In general, with respect to the network system described in FIG. 2, because the same cellular protocols are used in communications involving IP access points as with traditional radio towers, the cellular service provider maintains a large degree of system compatibility even though using an IP-based network. For example, the various systems of the cellular service provider that deliver content and handle mobility may not even need to be aware that a subscriber's mobile device is on an IP-based wireless telecommunications network. Instead, the various systems of the cellular service provider assume the mobile device is on its native cellular network. The IP network is, therefore, abstracted with respect to the cellular network, regardless of whether the mobile device connects to the cellular network via a base station (e.g., for licensed spectrum access) or a wireless access point (e.g., for licensed, semilicensed and/or unlicensed spectrum access—such as spectrums for IP-based wireless telecommunications). Likewise, at a protocol level, because the same cellular protocols are used in communications involving the IP access points as with traditional radio towers, the cellular service provider maintains a large degree of system compatibility even though using an IP-based network.

Referring to FIG. 2, a sample network system 200 combines a cellular telephone network 202 (such as a GSM network) and an IP network 204 in a UMA-type configuration that provides service to the user of a mobile device 206 or a landline telephone 236. Such service may include voice services, and also supplementary services such as call forwarding and call waiting, text messaging services (e.g., SMS), and data-based services like ring tone downloads, game downloads, picture messaging, email and web browsing. Further, since the mobile device 206 is connected to an IP network, all manner of data services available over such networks may be provided to the mobile device 206.

In general, the described network system 200 accepts registration requests from the mobile device 206. The accepted registration requests can be requests to either the cellular telephone network 202 or to the IP-based network 204. Accordingly, to handle requests to the cellular telephone network 202, the cellular telephone network 202 includes one or more cell towers 208 that are configured to accept cellular communications 210 from the mobile device 206. The cell towers 208 are connected to a base station controller 212 (such as a base station controller/radio network controller (BSC/RNC)) via a private network 214. The private network 214 can include a variety of connections (not shown) such as T1 lines, a wide area network (WAN), a local area network (LAN), various network switches, and other similar components.

The base station controller 212 controls communication traffic to a carrier core network 216, where all communications are managed (including both cellular and IP-based). Components of the carrier core network 216 in this example include a switch (e.g., a mobile switching center or MSC) 218, which is configured to control data/call flows and perform load balancing, as well as other functions. The carrier core network 216 may also include a variety of system databases such as an operation support subsystem (OSS) database 220, a business support system (BSS) database 222, and home location register (HLR) 224 or other central subscriber database that contains details of a carrier's subscribers for billing, call logging, etc.

The sample network system 200 of FIG. 2 further includes one or more access points 226 that can accept IP-based communications 228 from the mobile device 206. For example, each access point 226 can be configured as part of a wireless network in one or more locations such as a public network 230, a home network 232, or a private business network 234. Each access point 226 is coupled to the IP network 204 through, for example, a broadband connection (not shown) such as a DSL (Digital Subscriber Line) modem, a cable modem, a satellite modem, or any other broadband device.

Figure 3:
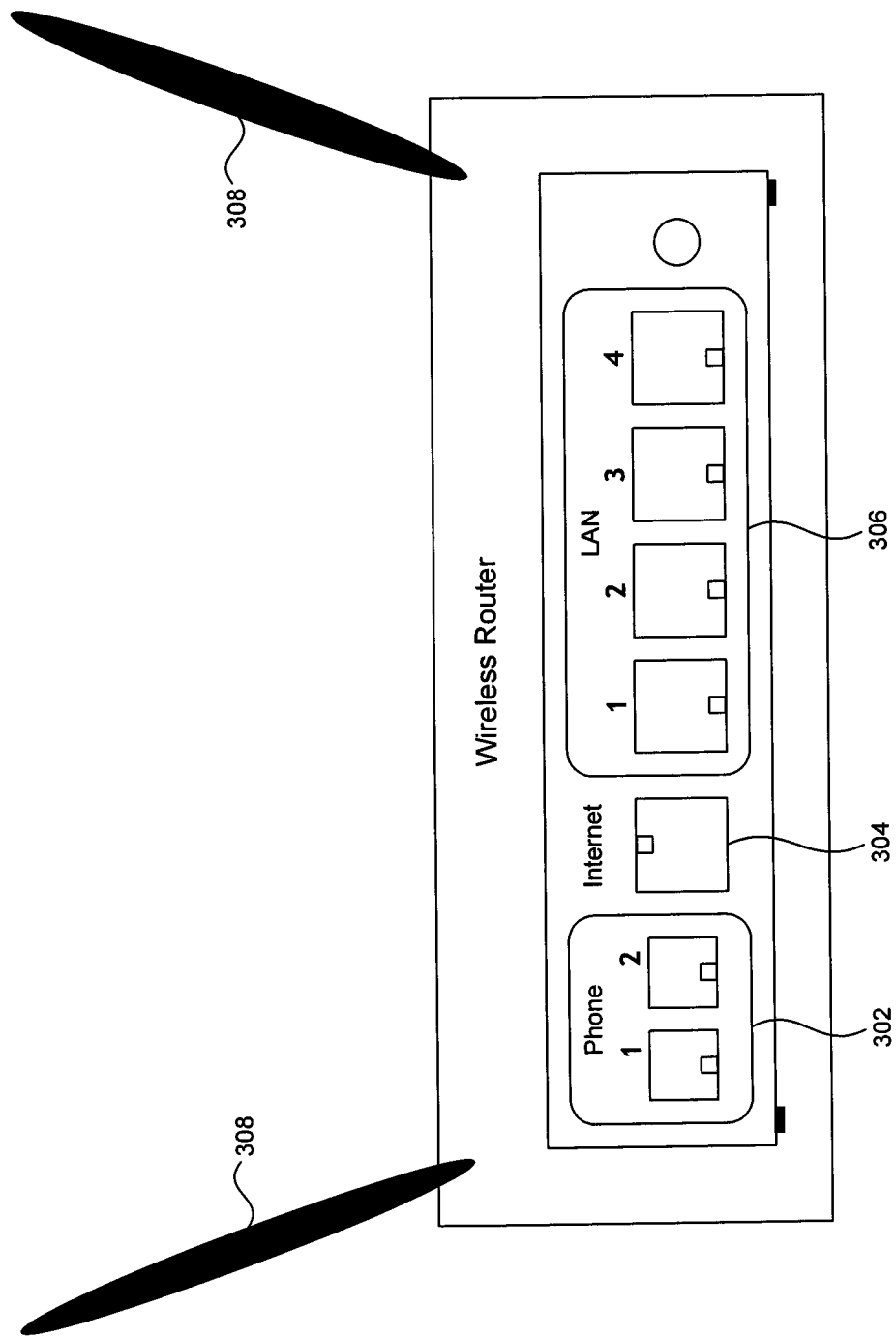
FIG. 3 illustrates the back panel of an access point capable of supporting two landline telephones in addition to a wireless connection.

In addition, the access points 226 may be configured with one or more landline telephone connectors. For example, FIG. 3 illustrates the back panel of an access point 226 capable of supporting two landline telephones (e.g. traditional landline telephones and cordless telephones) in addition to a wireless connection. The access point 226 includes a WAN connector 304, which connects the access point 226 to the IP network 204. The access point 230 also includes a plurality of data connectors 306 that connect to computers or other devices and are used to carry data traffic. The access point 226 has one or more antennas 308 that support wireless connections for data transmission, such as for an IP-based telecommunications connection. Finally, the access point 226 includes two telephone connectors 302, which can accept a cable connecting to a landline telephone. In most cases, this is implemented as a RJ-11 connector, but one skilled in the art will appreciate that other standard connectors could be used, including a RJ-14 or RJ-25 connector. The access point 226 also includes a port, slot, or socket (shown in FIG. 5) configured to accept an identifier module that stores data associated with a subscriber or a voice connection, such as a subscriber identifier. The memory device may include a tamper-resistant memory that may store information used to enable a device to connect to the carrier network 216 and to authenticate the device to the carrier network 216. For example, the subscriber identifier may be a unique or rare secure identification number associated with a subscriber, an organization, or a calling plan. In a UMA system, the slot is configured to accept a Subscriber Identity Module (SIM) card similar to those used for GSM mobile devices. The access point 226 may include a separate slot for each telephone connector 302 to allow each landline telephone 236 to be separately authorized.

Returning to FIG. 2, a landline telephone 236 is connected to the access point 232 through a standard wired connection 238 to one of the telephone connections 302. In this configuration, the access point 226 converts the incoming analog voice signal into digital form and encapsulates the signal for transmission over the IP network 204. As discussed below, the access point 226 also communicates with the security gateway 240 or the network controller 242 to authorize the landline telephone to make calls through the carrier network 216. The access point 226 is generally configured to provision a separate connection for each telephone connector 302.

In some configurations, the access point 226 includes components to provide the connected landline telephone with a simulation of a Plain Old Telephone Service (POTS) network. For example, the access point 226 may act as a POTS end office by providing a dial tone when the user lifts the telephone off the hook if there is a connection to the carrier network. The access point may also provide calling name and number for incoming calls by translating the data from the IP-based telecommunications format to the format used by a POTS caller ID service. It may similarly provide the ability to toggle between calls for call waiting using the standard flash hook by translating the POTS signal into the equivalent UMA or GSM format. The access point 226 may also provide a standard POTS stutter dial tone to indicate new voice mail. The access point 226 could do this by periodically querying the carrier network 216 to determine if new voice mail is available and providing the stutter dial tone if the carrier network indicates that there is new voice mail. Alternatively, or in addition to the stutter tone, the access point 226 may include an indicator (e.g. a flashing light) to notify the user that new voice mail is available.

When the mobile device 206 attempts to access the IP network 204 (i.e., to initiate an IP-based communication), information (e.g., data, voice, SMS, etc.) is initially formatted in the cellular system's 202 native protocol and then encapsulated into Internet Protocol (IP) packets, which are transmitted to the access point 226 and routed through the IP network 204 to a security gateway 240. In contrast to non-IP communication requests, such transmissions bypass the cellular telephone system's 202 existing network of radio towers. Similarly, when the landline telephone 236 attempts to make a call through the IP network 204, the access point 232 encapsulates the voice signal into IP packets that are then routed through the IP network 204 to the security gateway 240. The security gateway 240 controls access to a network controller 242, which communicates with a data store 246 for logging and accessing communications data. Thus, one function of the network controller 242 is to manage access to the carrier network 216 when dealing with an IP-based communication (in a similar manner to that performed by the base station controller 212 for a non-IP-based communication).

In one example, authentication of a request for access by the mobile device 206 or the access point 226 over the IP network 204 is handled by the security gateway 240, which communicates with an authentication, access and authorization (AAA) module 244 that is most likely associated with the carrier network 216. Challenges and responses to requests for access by the mobile device 206 or the access point 232 are communicated between the HLR 224 and the AAA module 244. When authorization is granted, the security gateway 240 communicates the assignment of an IP address to the mobile device 206 or access point 226 that requested access. Once the security gateway 240 passes the IP address to the mobile device 206 or access point 226, the public IP address assigned to the device is passed to the network controller 242.

In another authorization example, upon receiving identification information from the mobile device 206, the network controller 242 may query the data store 246 to determine if the mobile device 206 is authorized for accessing the IP network 204. Sample identifiers that may be utilized to determine access include a media access control (MAC) address associated with an access point, a mobile device or subscriber identifier (such as an International Mobile Subscriber Identifier (IMSI)), an Internet Protocol (IP) address (or "Public IP address") associated with the access point, a fully qualified domain name (FQDN), or other similar types of information. The data store 246 may be a single database, table, or list, or a combination of databases, tables, or lists, such as one for IP addresses 248, one of MAC addresses 250, one for subscriber identifiers 252, and one for FQDNs 254. The data store 246 may include "blocked" identifiers as well as "authorized" identifiers. Authorized accesses to the IP-based wireless telecommunications network may be maintained by the network controller 242 in an authorized session table or similar data construct.

In some cases, the signaling portion of a communication (e.g., the portion of the communication that governs various overhead aspects of the communication such as, for example, when the call starts, when the call stops, initiating a telephone ring, etc.) is routed through the network controller 242 to the switch 218, while the voice bearer portion of the communication (e.g., the portion of the communication that contains the actual content (either data or voice information) of the communication) is routed through the network controller 242 to a media gateway 256. In other words, the media gateway 256 controls the content flow between the service provider and the mobile device 206, while the switch 218 controls the signaling flow (or controls overhead-related flow) between the service provider and the mobile device 216.

Figure 4:
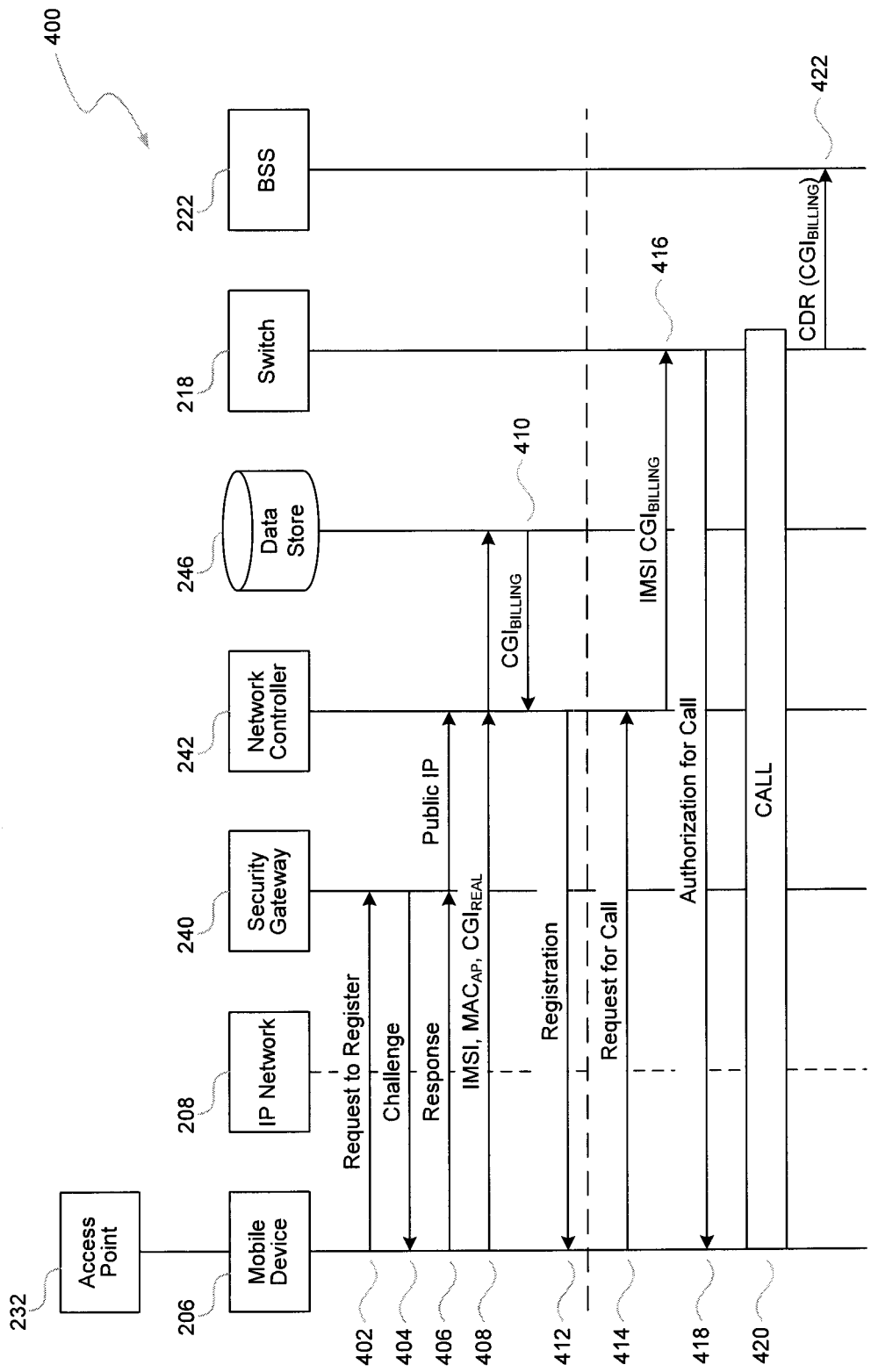
FIG. 4 illustrates a timing diagram of actions in a UMA network for provisioning telecommunications services.

FIG. 4 illustrates an example of a timing diagram 400 of steps in a UMA network for provisioning telecommunications services, including registering a mobile device and facilitating a call from the mobile device 206. However, as noted herein, the disclosed system is not limited to UMA services and may include any other service suitable for providing telecommunications services. For example, the disclosed system may also be configured to provide access using licensed frequency bands. The call registration process is illustrated by communication steps 402-412, while the calling process is illustrated by communication steps 414-422. The steps of the timing diagram 400 may also be used to support calls from a landline telephone 236 connected to the access point 226. In those cases, the registration and calling processes are initiated by the access point 226, rather than the mobile device 206.

At step 402, mobile device 206 or the access point 226 initiates a call by sending a request to register to the security gateway 240. The security gateway 240 replies with an authentication challenge communicated back to the mobile device 206 or access point 226 at step 404. At step 406, the mobile device 206 or access point 226 responds to the authentication challenge with a response communicated to security gateway 240. Also at step 406, the security gateway 240 communicates a public IP address assigned to the access point 226 to the network controller 242. The mobile device 206 also communicates a subscriber identifier (such as the IMSI ID) and a Cell Global Identifier (CGI) record ($CGI_{REAL}$) to the security gateway 240. The CGI record is an identifier in a GSM network that uniquely identifies a base station initiating a call through the core network. In a UMA connection from a mobile device 206, $CGI_{REAL}$ is the CGI record for the nearest base station 208. For a connection from an access point 226, $CGI_{REAL}$ may be a hard-coded value unique to the access point 226 or may be selected based on other criteria, such as geographic location. At step 408, the security gateway 240 transmits the subscriber identifier, $CGI_{REAL}$, and the MAC address ($MAC_{AP}$) from the access point 226 to the network controller 242.

The mobile device 206 or access point 226 may also send connection type data indicating how the device is connected to the carrier network or what device is making such a connection. In a UMA (or GSM) network, this data is sent as a classmark, which indicates service, equipment, and radio capabilities. Thus, the connection type data has a first classmark value associated with the mobile device 206, and a second classmark value associated with the access point 226. Alternatively, the connection type data may specify the type of network being used to connect to the carrier network 216. In this implementation, the mobile device 206 sends a first classmark value when the mobile device 206 connects through the cellular network 202 and a second classmark value when the mobile device 206 connects through the IP Network 204. Similarly, the access point 226 transmits the second value when it connects through the IP Network 204 to provision a connection for the landline telephone 236.

At step 408, network controller 242 communicates with data store 246, which replies with $CGI_{BILLING}$ at step 410. $CGI_{BILLING}$ is used by the UMA network to ensure that the call is billed correctly. Billing is determined based on the information received in step 408. For example, billing may be determined based on the subscriber identifier alone or in combination with the connection type data/classmark. In one implementation, the network controller 242 provides different billing for the subscriber depending on whether the connection type data indicates that the subscriber is connecting through the cellular network 202 or the IP network 204. Thus, in a UMA network the network controller 242 may provide unmetered calling if the SIM card is used in the access point 226 and per-minute charging if the SIM card is used in a mobile device 206. For example, if a SIM card from the mobile device 206 were inserted into the access point 226, then landline calls made through that access point would incur cellular calling minutes for the calling plan that is associated with that mobile device SIM. Thus, any SIM would work for provisioning land line service through the access point, but the billing rate would differ. (However, if conversely the SIM from the access point 226 were inserted into the mobile device 206, then access may be denied, based at least in part on the transmitted classmark.)

The network controller 242 may be configured to use the subscriber identifier to determine eligibility for price plans. For example, a manufacturer or service provider may produce or distribute identifier modules having certain ranges of consecutively numbered subscriber identifiers. The network then allows devices having a subscriber identifier that falls within a certain range to have access under a certain pricing plan. This technique may be used to ensure that favorably-priced fixed line subscriptions are available to landline telephones, while mobile devices are restricted to accessing the service using mobile rates. The network may also provide two or more differing price plans or billing rates based on two or more differing ranges of subscriber identifiers. Many other alternatives are of course possible, such as specific codes or characters included in or algorithmically derived from subscriber identifiers to determine specific pricing plans associated with those subscriber identifiers.

The network controller 242 may also perform other types of authentication during this step. For example, current Federal Communications Commission regulations require that fixed VoIP connections must be associated with a physical or geographic address in order to enable enhanced 911 emergency services (E911). Thus, the network controller 242 may also confirm that the data store 246 includes an E911 address for the access point 226 before allowing the voice connection. For example, the network controller 242 may use the subscriber identifier as an index to look up an E911 address and reject the connection if no address is found.

At step 412, network controller 242 communicates a registration completion message to the mobile device 206. Once the registration is completed, mobile device 206 or access point 226 communicates with network controller 242 to request a call at step 414. At step 416, the network controller 242 communicates the subscriber identifier and $CGI_{BILLING}$ to switch 218. Switch 218 authorizes the call at step 418 such that the device can communicate over a communication channel established through switch 218 at step 420. At step 422, the call is terminated and switch 218 communicates a call data record (CDR) to the billing system (i.e. the BSS 222).

II. Selectively Provisioning Connections Between the Access Point and the Network A method and system for reducing network load by selectively provisioning connections between an access point and the carrier network is disclosed. One advantage of providing an IP-based telecommunications connection for a landline telephone is that it allows customers to pay a single bill for all telephone services. In addition, a landline telephone may be easier and more ergonomic for customers to use at home because such telephones do not have to be as compact as a mobile device. Also, customers may prefer to use a landline telephone because they do not have to worry about draining the battery, as they would with a mobile phone. However, a problem that arises when the access point 226 supports connections from a landline telephone is that it is less clear when the connection needs to be provisioned. As discussed above for FIGS. 1-4, every connection between a user and the carrier network uses some resources. The resources are reserved (and thus inaccessible for others) even if the connection is not currently in use. Thus, it is desirable that the system reserve resources only when they are needed. A mobile device 206 is generally configured with identifying information (such as the IMSI or other unique or rare secure identifier) that the network can use to verify authorization. However, a landline telephone lacks these identifiers. It would be a waste of resources to provision a call when the user is not authorized to connect.

Figure 5A:
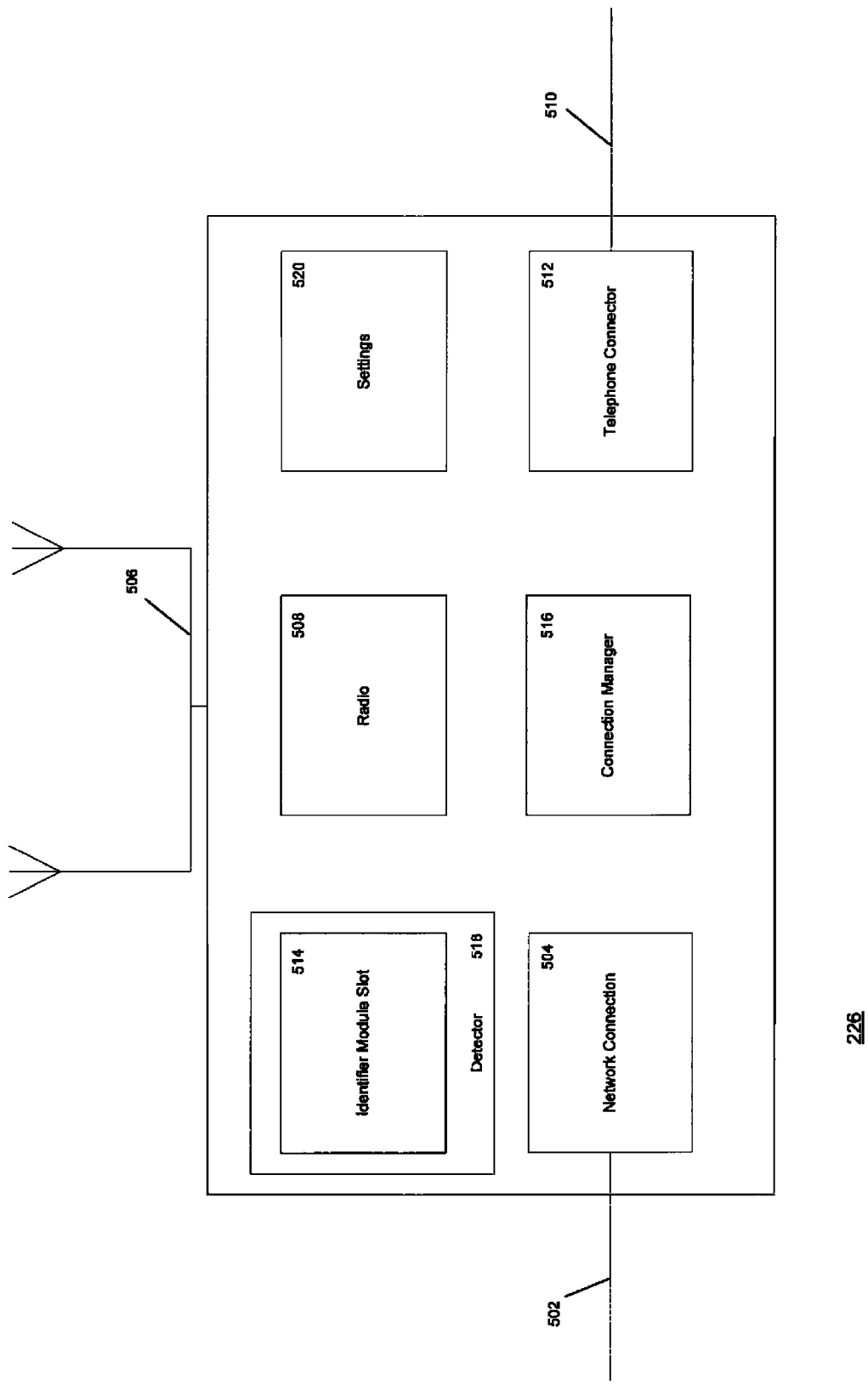
FIG. 5A illustrates a block diagram of an access point capable of selectively provisioning a connection for a landline telephone.

FIG. 5 illustrates a block diagram of an access point 226 capable of selectively provisioning a connection for a landline telephone 232. The access point 226 includes a network connection component 504 that provides an interface between the access point 226 and the IP network 204. The network connection component 504 is connected to the network through a network cable 502. The network connection component 504 may be any type known in the art, such as an Ethernet network chip. The connection is supported by a standard network protocol stack, such as a TCP/IP stack (not shown). Similarly, the access point 226 includes a telephone connector component 512, which is connected to a telephone cord 510. The telephone connector component receives a landline telephone signal through the telephone cord 510 and passes it to other processing components (not shown). The other processing components include, for example, a component to convert the analog signal into a digital form and encapsulate the data for transmission. The access point 226 may also have a wireless LAN (WLAN) radio component 508, which is connected to one or more antennas 506. The WLAN radio component 508 provides wireless networking support to enable mobile devices 206 to connect as described above. The access point 226 may include other radio components instead of, or in addition to, the WLAN radio component 508. For example, the access point 226 may include radio components capable of operating in licensed frequency bands using wireless standards such as GSM or CDMA2000. The access point 226 may also include radio components capable of operating in unlicensed frequency bands using other wireless standards, such as UWB. The access point 226 also has an identifier module slot 514, which is configured to receive an identifier module having a tamper-resistant memory. The tamper-resistant memory stores subscriber or connection-specific data. In one implementation, this could include a SIM card similar to the cards used in, e.g., a GSM mobile device. The access point 226 also includes a settings component 520, which stores configuration settings for the access point 226, such as security settings and the IP address of the security gateway 240.

The identifier module includes information that defines the subscriber's identity. Identity could include any of the identification information described above, such as subscriber identifier (e.g. IMSI, mobile identifier number (MIN), or similar identifiers) equipment identifiers (e.g. MAC address, electronic serial number (ESN), or similar identifiers), FQDN, IP address, or a combination of these. Identity could also be defined by a value algorithmically generated from the identification information, such as the exclusive OR, addition, or concatenation of two or more numbers.

Figure 5B:
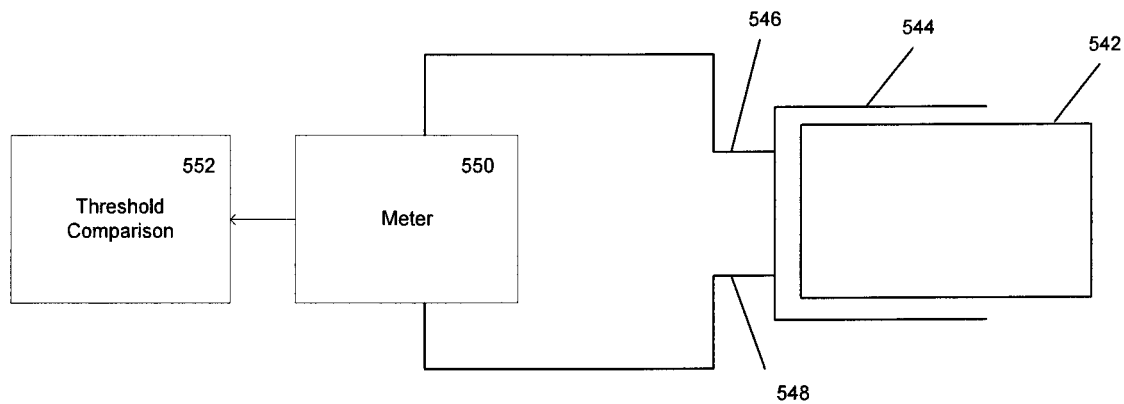
FIG. 5B illustrates a circuit suitable for using electrical characteristics to detect that an identifier module is present.

The identifier module slot 514 is associated with a detection component 518, which determines if an identifier module is present in the identifier module slot 512. The detection component 518 may use any method known in the art to detect the identifier module. For example, FIG. 5B illustrates a simple circuit 540 suitable for using electrical characteristics to detect that an identifier module is present, although more complex detectors may be employed, including those that read data from the identifier module. Two wires, 546 and 548, are electrically connected to the identifier module slot 544. The wires 546 and 548 are connected so that when an identifier module 542 is inserted into the identifier module slot 544, an electrical circuit is formed connecting wire 546 to wire 548. The wires 546 and 548 are connected to a meter 550, which is configured to measure the resistance, capacitance, inductance, or other impedance in the circuit including wires 546 and 548. If the identifier module slot 544 does not contain an identifier module, the meter 550 will detect an infinite resistance (or alternatively, a high capacitance). If an identifier module is present, the meter 550 will detect a measurable resistance (or a much smaller capacitance). The meter 550 provides the measured value to a threshold comparison component 552, which compares the measured value to a threshold value. The threshold comparison component 552 then determines that an identifier module 542 is inserted when the measured value crosses the threshold value. The threshold comparison component 552 can be configured with thresholds that are determined theoretically or experimentally. Of course, the circuit 540 can also be configured to use a combination of resistance, capacitance, inductance, or other impedance to detect the identifier module 542. Further, the circuit 540 may read data from the identifier module to provide more complete or thorough detection.

Figure 5C:
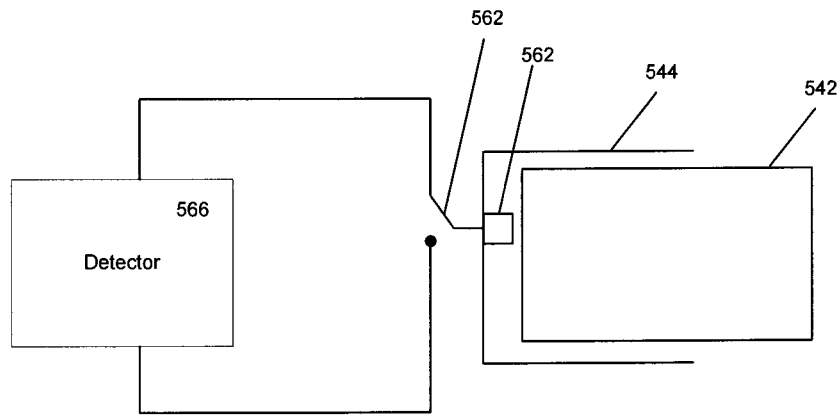
FIG. 5C illustrates a circuit suitable for using mechanical characteristics to detect that an identifier module is present.

Alternatively, FIG. 5C illustrates a circuit 560 suitable for using mechanical characteristics to detect that an identifier module is present. The identifier module slot 544 includes a button 562 or similar mechanical component connected to a mechanical or electromechanical switch 564. The switch 564 is connected to the terminals of a detector 566. When an identifier module 542 is not present, the switch 564 is open and no current can flow between the terminals of the detector 566. When an identifier module 542 is inserted, it presses the button 562, closing the switch 564 and creating a closed circuit between the terminals. Thus, the detector 566 determines that the identifier module 542 is inserted when the circuit is closed.

The access point also has a connection manager component 516. The connection manager component 516 provisions call connections between the access point 226 and the carrier network 216 when the access point 226 determines that the connection should be set up. The connection manager 516 executes the call setup steps described above for FIGS. 1-4, such as contacting the security gateway 240. In a UMA network, the connection manager component 516 implements a UMA client for connecting with the carrier network 216.

Figure 6:
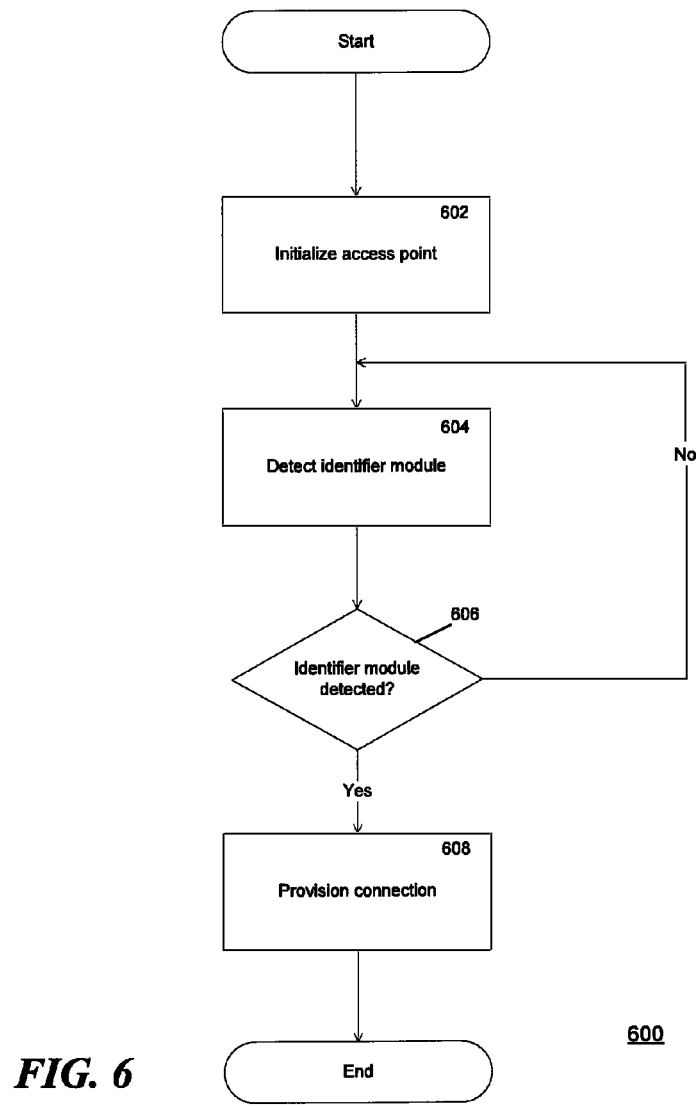
FIG. 6 illustrates a process for selectively provisioning telecommunications services between a landline telephone and an IP-based network.

The connection manager component 516 uses data from these components to selectively provision a connection with the carrier network. FIG. 6 illustrates a process 600 for selectively provisioning a connection between a landline telephone and an IP-based network. The process begins at block 602, where the access point starts up and initializes. During this step, the access point 226 executes initialization tasks, such as starting the radio component 508 to provide wireless networking and the data connectors 306 to provide wired data networking. In this step, the access point 226 also determines if it is connected to the IP network 204 through the network connection component 504. This may include detecting a physical connection to the WAN connector 304 or determining if the access point 226 has an IP address for the WAN connection.

Once the access point 226 is running and the above (optional) checks are performed, the system proceeds to block 604, where it attempts to detect an identifier module in the identifier module slot 514 using any method known in the art, such as the methods discussed above. The system then proceeds to decision block 606, where the system selects a processing branch depending on whether the detection component 518 found an identifier module. If an identifier module was detected, the system proceeds to block 608, where the connection manager component 516 provisions the connection for the landline telephone. If a telephone connection was not detected, the system returns to block 604, where it again attempts to detect the identifier module.

The system may, for example, be configured to loop at a specified interval, such as every 3 seconds, to detect whether an identifier module has been inserted into the identifier module slot 514. Alternatively, the identifier module slot 514 may be configured to act as an interrupt by sending a notification signal to the connection manager component automatically when it detects that a module has been inserted. In this example, the connection manager component 516 is configured to provision a connection in response to the interrupt signal. Additionally, the system may be configured to only check for the identifier module at startup time, in which case the loop terminates after the first check. In this configuration, an access point 226 provisions a connection only after restarting or resetting.

As noted above, in addition to detecting an identifier module in the identifier module slot 514, the system in step 606 may perform other checks. For example the access point may transmit the stored subscriber identifier (e.g. IMSI) to the network for validation. Alternatively or additionally, the network may confirm that a street address is associated with the access point (e.g. by comparing the IMSI to a stored record for an address associated with that IMSI) for E911 validation.

Many other alternatives or additions are possible. For example, as shown in FIG. 3, the access point 226 may have two or more telephone connectors 402. In this configuration, the access point 226 provisions connections for each connector separately. Similarly, the access point 226 may contain an identifier module slot 514 for each telephone connector 302. The access point 226 then uses each identifier module to authorize the connection separately. Thus, the access point 226 may execute the detection and provisioning steps of the method of FIG. 6 independently for each connector.

Alternatively or additionally, the subscriber identifier may be provided to the network via a means different from a physical identifier module inserted into the access point. For example, the land line phone 236 may have the identifier module slot to receive the identifier module and communicate the IMSI or other data stored therein to the access point 226 when the phone is connected to the access point 226 via telephone connector 302. As another example, the access point may connect to a nearby identifier module that has not only tamper resistant memory, but also capability to connect through a wired or wireless connection. In this example, the identifier module may be an RFID tag, or a read-only memory device with a small radio (e.g. Bluetooth or IEEE 802.11 radio), and the access point includes an appropriate reader, such as an RFID reader, Bluetooth radio, etc.

III. Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the technology.

We claim:

1. A wireless local area network (WLAN) access point configured for facilitating IP-based communications with a telecommunications system, the access point comprising:
   an antenna;
   a WLAN radio connected to the antenna and configured to provide WLAN connectivity;
   a network connection component configured to communicate with an IP-based network and connected to transmit and receive data received from WLAN radio;
   a telephone connector component configured to accept a wired connection with a landline telephone;
   an identification module socket configured to accept an identification module,
      wherein the identification module includes a tamper-resistant memory, and
      wherein the tamper-resistant memory has stored therein a subscriber identifier, and
      wherein the subscriber identifier is neither a Medium Access Control (MAC) address nor an electronic serial number (ESN);
   at least one detection component connected to the telephone connector component and configured to detect if an identification module is present in the identification module socket and if a landline telephone is connected to the telephone connector component; and
   a connection manager configured to selectively provision telecommunications services between the telephone connector component and the IP-based network in response to the detection component detecting that the identification module socket contains an identification module and that the telephone connector component is connected to a landline telephone,
      wherein the telecommunications services are not provided if the detection component does not detect an identification module in the identification module socket, and does not detect a landline telephone connected to the telephone connector component,
      wherein provisioning comprises:
         registering with a cellular telephone carrier network, providing user-specific information to the cellular telephone carrier network,
            wherein at least some of the user-specific information is provided through out-of-band communications, and
         receiving a resource allocation from the cellular telephone carrier network.

2. The WLAN access point of claim 1, wherein the identification module socket is a Subscriber Identification Module (SIM) card socket configured to accept a SIM card.

3. The WLAN access point of claim 1, wherein the detection component comprises a mechanical or electromechanical switch to detect if the identification module is present.

4. The WLAN access point of claim 1, wherein the detection component uses electrical characteristics of the identification module socket to detect the identification module, the electrical characteristics comprising one or more of the following: resistance, capacitance, or inductance.

5. The WLAN access point of claim 1, wherein the detection component is configured to generate an interrupt signal when the identification module is detected and wherein the connection manager is configured to provision the telecommunications services in response to the interrupt signal.

6. The WLAN access point of claim 1, wherein the telecommunications services are Unlicensed Mobile Access (UMA) services.

7. A system for managing use of an access point configured for facilitating IP-based communications in a telecommunications system, the system comprising:
   a telephone connector component configured to accept a connection with a landline telephone device;
   a network connection component configured to communicate with an IP-based network;
   an identifier detection component configured to detect whether a subscriber identifier has been provided by a subscriber to the access point;
   an identification module socket; and
   a connection manager configured to selectively provision a telecommunications service between the telephone connector component and the IP-based network in response to:
      determining that the subscriber identifier indicates that the telecommunications service is permitted and
      the identifier detection component detecting that the subscriber identifier has been provided to the access point and that the telephone connector component is connected to a landline telephone device,
         wherein the telecommunications service is not provided if the detection component does not detect an identification module in the identification module socket, and does not detect a landline telephone connected to the telephone connector component.

8. The system of claim 7, wherein the identification module socket includes an identification module acceptor configured to accept an identification module having the subscriber identifier.

9. The system of claim 7, further comprising multiple telephone connector components, each telephone connector component having an associated identifier detection component, wherein the individual identifier detection components are configured to independently detect if a subscriber identifier has been provided and the connection manager is configured to independently provision telecommunications services between the IP-based network and individual ones of the multiple telephone connector components.

10. The system of claim 7, wherein the identification module socket includes an identification module slot configured to accept an identification module having the subscriber identifier, wherein the identifier detection component uses the impedance of the identification module slot to detect if the identification module is present.

11. The system of claim 7, further comprising a radio component configured to provide telecommunications services using a licensed frequency band.

12. The system of claim 7, further comprising a radio component configured to provide telecommunications services using an unlicensed frequency band.

* * * * *